(12) United States Patent
Cerini et al.

(10) Patent No.: US 12,464,294 B2
(45) Date of Patent: Nov. 4, 2025

(54) MEMBRANE MICROELECTROMECHANICAL ELECTROACOUSTIC TRANSDUCER

(71) Applicant: STMICROELECTRONICS S.r.l., Agrate Brianza (IT)

(72) Inventors: Fabrizio Cerini, Magenta (IT); Silvia Adorno, Novate Milanese (IT); Marco Salina, Cremosano (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 107 days.

(21) Appl. No.: 18/295,673

(22) Filed: Apr. 4, 2023

(65) Prior Publication Data

US 2023/0328456 A1    Oct. 12, 2023

(30) Foreign Application Priority Data

Apr. 8, 2022   (IT) .................. 102022000007043
Jun. 3, 2022   (IT) .................. 102022000011810

(51) Int. Cl.
  *H04R 17/00*   (2006.01)
  *H04R 7/06*    (2006.01)
  *H04R 7/18*    (2006.01)
  *H10N 30/20*   (2023.01)

(52) U.S. Cl.
  CPC ............ *H04R 17/005* (2013.01); *H04R 7/06* (2013.01); *H04R 7/18* (2013.01); *H10N 30/20* (2023.02); *H04R 2201/003* (2013.01); *H04R 2400/11* (2013.01)

(58) Field of Classification Search
  CPC .......... H04R 17/005; H04R 7/06; H04R 7/18; H04R 2201/003; H04R 2400/11
  See application file for complete search history.

(56) References Cited

U.S. PATENT DOCUMENTS

| | | |
|---|---|---|
| 7,555,133 B2 | 6/2009 | Hama |
| 8,896,184 B2 | 11/2014 | Grosh et al. |
| 8,958,595 B2 | 2/2015 | Hwang et al. |
| 9,386,379 B2 | 7/2016 | Sparks et al. |
| 9,497,556 B2 | 11/2016 | Kaltenbacher et al. |
| 10,034,097 B2 | 7/2018 | Clerici et al. |
| 10,623,866 B2 | 4/2020 | Cerini et al. |

(Continued)

FOREIGN PATENT DOCUMENTS

| | | |
|---|---|---|
| CN | 101313628 A | 11/2008 |
| CN | 101941669 A | 1/2011 |

(Continued)

OTHER PUBLICATIONS

Stoppel et al., "New Integrated Full-Range MEMS Speaker for In-Ear Applications," MEMS 2018, Belfast, Northern Ireland, UK, Jan. 21-25, 2018, pp. 1068-1071.

*Primary Examiner* — Sunita Joshi
(74) *Attorney, Agent, or Firm* — Seed IP Group LLP

(57) ABSTRACT

A microelectromechanical electroacoustic transducer includes a supporting frame of semiconductor material, a membrane of semiconductor material, connected to the supporting frame along a perimeter and having central symmetry, and a piezoelectric actuator on a peripheral portion of the membrane. The membrane has through slits of elongated shape arranged around a center of the membrane.

20 Claims, 10 Drawing Sheets

(56) References Cited

U.S. PATENT DOCUMENTS

| | | | |
|---|---|---|---|
| 2007/0058825 A1* | 3/2007 | Suzuki | H04R 19/005 |
| | | | 381/174 |
| 2012/0270352 A1 | 10/2012 | Huffman et al. | |
| 2013/0223023 A1 | 8/2013 | Dehe et al. | |
| 2014/0084395 A1 | 3/2014 | Sparks et al. | |
| 2015/0001647 A1 | 1/2015 | Dehe et al. | |
| 2017/0325030 A1 | 11/2017 | Stoppel et al. | |
| 2018/0234783 A1 | 8/2018 | Clerici et al. | |
| 2019/0082268 A1 | 3/2019 | Yoo | |
| 2019/0297427 A1 | 9/2019 | Zou | |
| 2020/0100033 A1 | 3/2020 | Stoppel et al. | |
| 2020/0382876 A1* | 12/2020 | Cerini | H04R 17/02 |
| 2021/0281940 A1 | 9/2021 | Zhao et al. | |

FOREIGN PATENT DOCUMENTS

| | | |
|---|---|---|
| CN | 104254046 A | 12/2014 |
| CN | 104418291 A | 3/2015 |
| CN | 108769881 A | 11/2018 |
| CN | 109525928 A | 3/2019 |
| CN | 109565634 A | 4/2019 |
| CN | 111147998 A | 5/2020 |
| CN | 112004181 A | 11/2020 |
| CN | 113490120 A | 10/2021 |
| EP | 3675522 A1 | 7/2020 |
| EP | 3843426 A1 | 6/2021 |
| EP | 3934275 A1 | 1/2022 |
| JP | 2018137297 A | 8/2018 |
| JP | 2021197513 A | 12/2021 |
| WO | 2019081220 A1 | 5/2019 |

* cited by examiner

MEMBRANE MICROELECTROMECHANICAL ELECTROACOUSTIC TRANSDUCER

BACKGROUND

Technical Field

The present disclosure relates to a membrane microelectromechanical electroacoustic transducer.

Description of the Related Art

As is known, the users of the vast majority of mobile and land processing and communication devices, such as smartphones, tablets, portable and desktop computers, benefit from the use of headphones and earphones, which are by now extremely wide spread. This wide spread, together with the fact that in many cases headphones and earphones are worn continuously for long periods of time, brings with it the need to provide comfortable and practical devices, without sacrificing the quality of audio reproduction. There is therefore an important push towards the manufacture of miniaturized speakers or micro-speakers. However, the solutions currently available are not entirely satisfactory and do not represent a valid compromise between dimensions and performance in terms of high sound pressure level (SPL) and costs.

Speakers of a first type utilize traditional electromagnetic actuation and are capable of ensuring high reproduction quality. However, electromagnetic actuation speakers are not suitable for being miniaturized beyond a certain limit.

Other solutions based on MEMS (Micro-Electro-Mechanical-Systems) technology allow better miniaturization levels to be obtained, but costs and/or performances are not yet suitable and such as to replace the electrodynamic speakers.

For example, hybrid devices are known wherein a microelectromechanical actuator, for example of a piezoelectric type, is coupled to a polymeric membrane, which is vibrated. The polymeric membrane has the advantage of high yielding (low Young's modulus), which allows a good response, but has critical issues from the point of view of process and costs. In fact, the membrane is applied to the portion of the device accommodating the actuator only in the back-end step, that is in dedicated processing steps, following the manufacture of the same actuator. Furthermore, hybrid micro-speakers are not suitable for being assembled on boards using SMT (Surface Mount Technology) technique, because the membrane is not capable of withstanding soldering temperatures.

Other devices made entirely using MEMS technology meet the miniaturization and cost requirements, but do not achieve sufficient performances as to response dynamics and bandwidth.

In particular, some micro-speakers comprise a continuous semiconductor membrane connected to a supporting frame along its perimeter. The criticality of these devices lies mainly in the poor yielding of the membrane. In fact, to obtain a suitable sound pressure level, the area reduction of the membrane due to miniaturization should be compensated by a greater displacement (the sound pressure is in fact proportional to the product A*d*f, where A is the area of the membrane, d is the displacement and f the frequency). However, the stiffness of the semiconductor material does not allow a sufficient displacement, especially at low frequencies.

In other MEMS micro-speakers, the membrane is discontinuous in the central portion precisely to have greater yielding and allow a wider displacement. More than a real membrane, the transducer comprises a plurality of cantilever structures, each of which defines a segment of a polygon or a sector of a circle and extends from a supporting frame. The vertices of the segments or sectors are adjacent to each other at the center of the transducer, without however being joined. A wider response dynamics may thus be obtained, which, however, is not constant on the audio bandwidth. The deformation of the cantilever structures, again especially at low frequencies and resonance, may in fact create a vent in the center of the transducer and compromise the performances. Furthermore, the quality of the response of MEMS micro-speakers of this type is very influenced by process spread, since even small differences in the cantilever structures may cause uneven movements and dissymmetry in the sound emission, impacting on the total harmonic distortion (THD). For example, the devices may simply be affected by the position in which they are formed on the semiconductor wafer. In particular, some characteristics such as zero-time deflection due to residual stresses of the materials may vary between devices that are closer to the center or the periphery of the wafer.

BRIEF SUMMARY

The aim of the present disclosure is to provide a microelectromechanical electroacoustic transducer which allows the limitations described to be overcome or at least mitigated.

At least one embodiment of a microelectromechanical electroacoustic transducer includes: a supporting frame, including semiconductor material; a central axis; a membrane of semiconductor material connected to the supporting frame along a perimeter and having symmetry about the central axis; a piezoelectric actuator on a peripheral portion of the membrane; wherein the membrane has a central connection portion and through slits of elongated shape arranged symmetrically around the central connection portion; and wherein the through slits have a width lower than twice a thickness of a viscous boundary layer of air.

BRIEF DESCRIPTION OF THE SEVERAL VIEWS OF THE DRAWINGS

For a better understanding of the disclosure, some embodiments thereof will now be described, purely by way of non-limiting example and with reference to the attached drawings, wherein.

DETAILED DESCRIPTION

Figure 1:
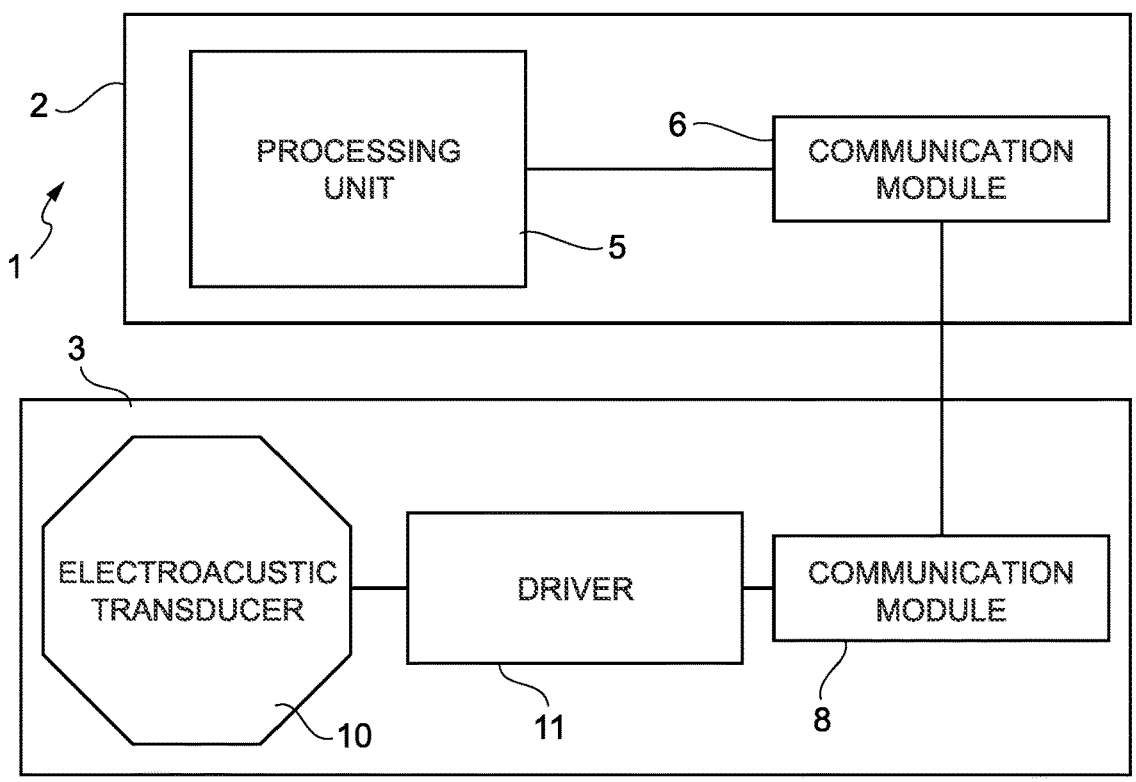
FIG. 1 is a simplified block diagram of a processing and communication device.

With reference to FIG. 1, an electronic system denoted as a whole with the number 1 comprises a processing and communication device 2 coupled in communication with a micro-amplifier 3.

The processing and communication device 2 may be any portable or land device that supports audio communication with a reproduction peripheral, such as the micro-amplifier 3. The processing and communication device 2 may be, but is not limited to, a portable computer, a personal computer, a tablet, a smartphone or a wearable device, for example a smartwatch, and comprises, in particular, a processing unit 5 and a communication module 6, coupled with a corresponding communication module 8 of the micro-amplifier 3. The processing and communication device 2 may generally comprise further components not illustrated, such as a display unit, memory units, insertion and pointing devices, peripherals, a battery, I/O interfaces.

The micro-amplifier 3 comprises, in addition to the communication module 8, an electroacoustic transducer 10 and a driver 11. The driver 11 receives audio signals through the communication module 8 and actuates the electroacoustic transducer 10.

The communication modules 6, 8 of the processing and communication device 2 and of the micro-amplifier 3 may be mutually coupled and in communication with each other by a wireless or cable connection.

With reference to FIGS. 2-5, the electroacoustic transducer 10 is a piezoelectric-type membrane microelectromechanical transducer and comprises a supporting frame 12, a membrane 13 and a piezoelectric actuator 15.

The supporting frame 12 is of semiconductor material and has a cavity 16 (FIGS. 4 and 5) open on one side and closed on the opposite side by the membrane 13. More precisely, the supporting frame 12 may comprise a substrate, for example of monocrystalline silicon, and one or more epitaxial layers, again of monocrystalline silicon, or pseudo-epitaxial or deposited layers of polycrystalline silicon.

Figure 2:
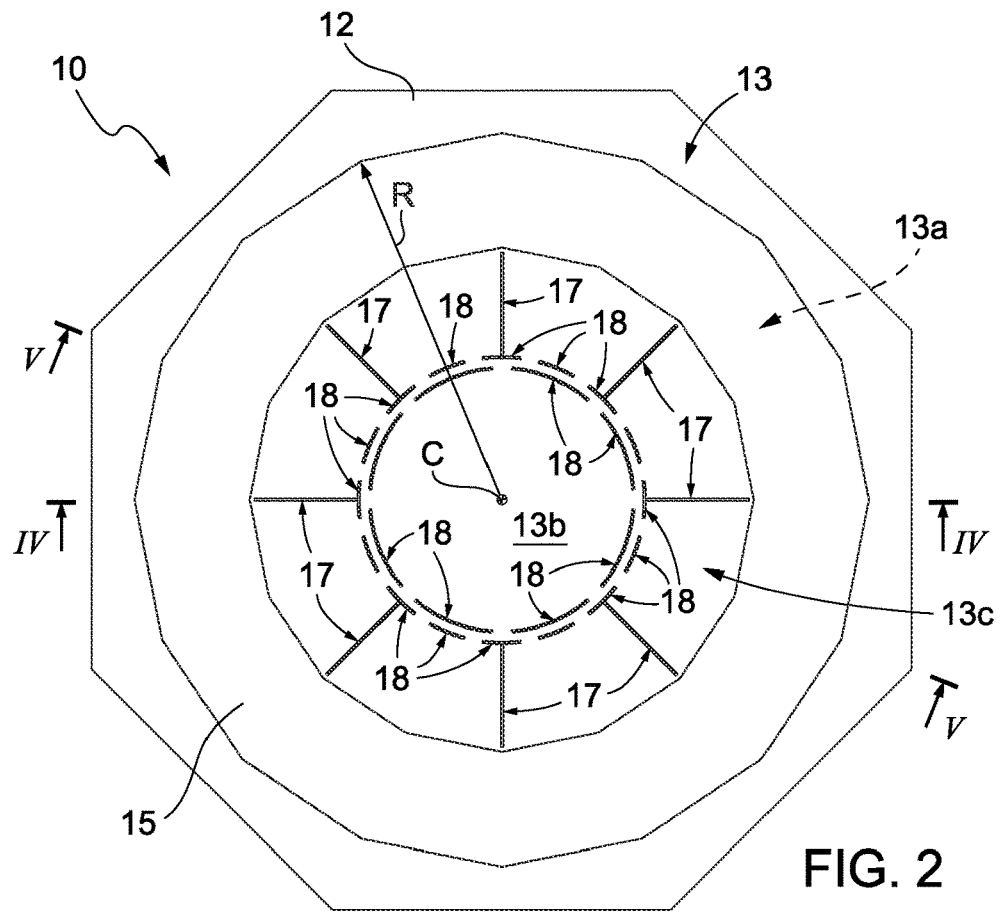
FIG. 2 is a top-plan view of an electroacoustic transducer according to an embodiment of the present disclosure incorporated in the device of FIG. 1.
Figure 3:
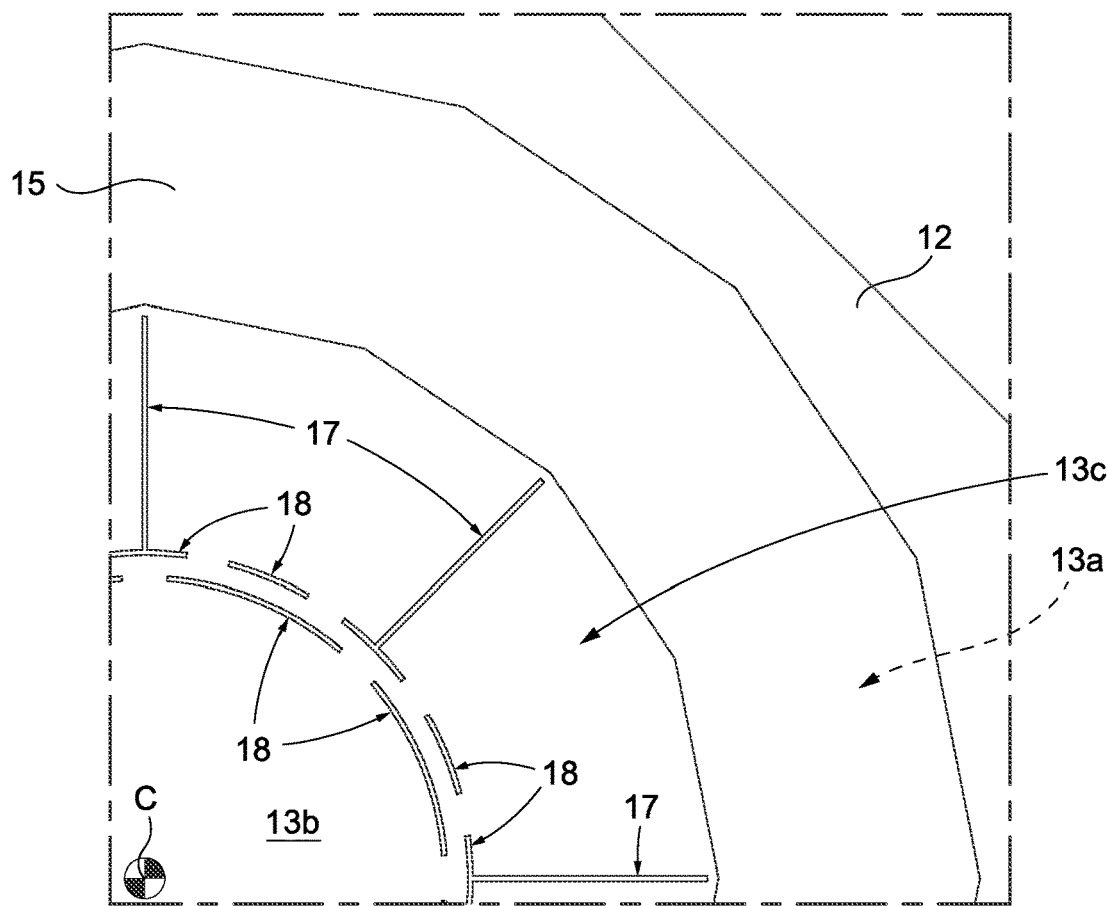
FIG. 3 shows an enlarged detail of FIG. 2.
Figure 4:
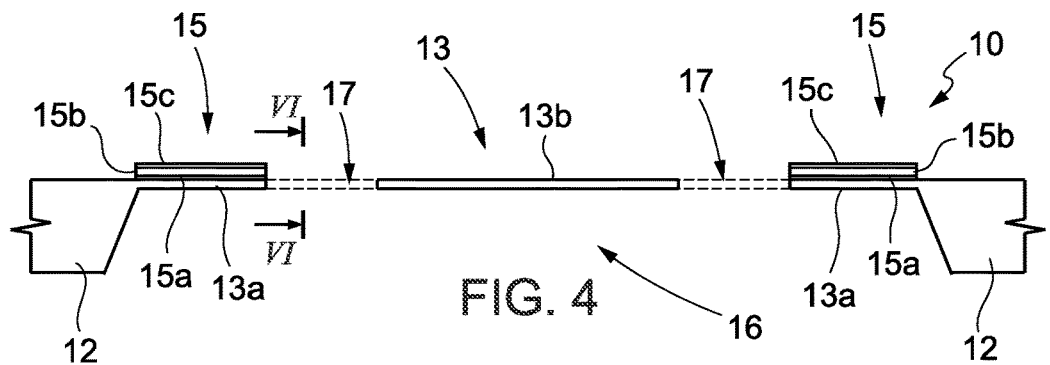
FIG. 4 is a cross-section through the transducer of FIG. 2, cut along line IV-IV of FIG. 2.
Figure 5:
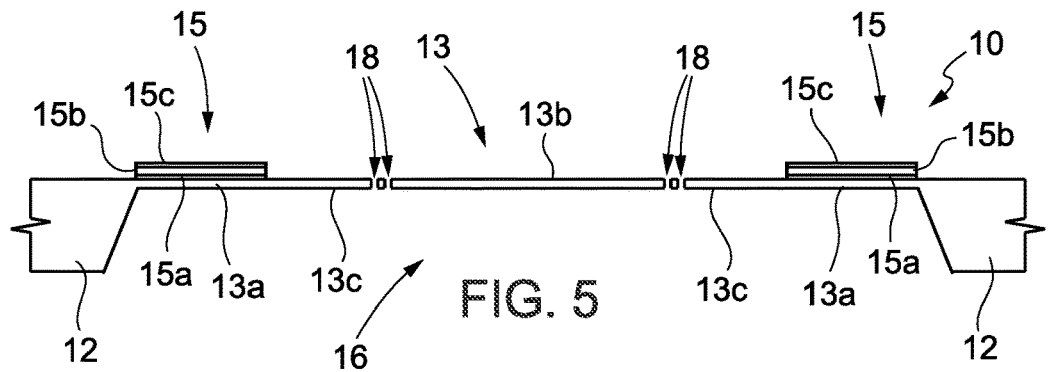
FIG. 5 is a cross-section through the transducer of FIG. 2, cut along line V-V of FIG. 2.

The membrane 13, also of semiconductor material, for example polycrystalline silicon, is connected to the supporting frame 12 along its perimeter and has symmetry with respect to a center C along a central axis. For example, the membrane 13 is symmetrical about a plane (e.g., a plane that passes through and along the upper and lower radial slits 17 as shown in FIG. 2 and through and along the central axis at the center C) that passes through and along the central axis at the center C. In some embodiments, the supporting frame 12 may be symmetrical about the plane as well. In some embodiments, the membrane 13 may be circular or have the shape of a polygon, for example with 16 sides, as in FIGS. 2 and 3. The membrane 13 has radius R, meaning thereby exactly the radius of the same membrane, if the membrane is circular, or the radius of a circumference circumscribed to the membrane, if the membrane has a polygonal shape.

The membrane 13 has a peripheral portion 13a, accommodating the piezoelectric actuator 15, a central connection portion 13b and an intermediate portion 13c between the peripheral portion 13a and the central connection portion 13b.

In the embodiment of FIGS. 2-5, the peripheral portion 13a of the membrane 13 is continuous and in practice defines a crown which extends cantilevered from the supporting frame 12 towards the inside approximately for one third of the radius R of the membrane 13. The piezoelectric actuator 15 is arranged symmetrically with respect to the center C of the membrane 13. In the embodiment illustrated in FIGS. 2-5, in particular, the piezoelectric actuator 15 has the shape of a polygonal ring and occupies the peripheral portion 13a of the membrane 13 (which, in this case, is polygonal). Alternatively, the piezoelectric actuator 15 may have the shape, for example, of a circular crown or comprise a plurality of piezoelectric actuation structures of trapezoidal shape, which occupy peripheral portions of respective segments of the membrane 13. The piezoelectric actuator 15 (FIGS. 4 and 5) is defined by a stack of layers which includes a lower electrode layer 15a, formed on the membrane 13, a piezoelectric layer 15b, for example lead zirconate titanate (PZT) or aluminum nitride (AlN), on the lower electrode layer 15a and an upper electrode layer 15c on the piezoelectric layer 15b. The piezoelectric actuator 15 is controlled by the driver 11 through connection lines not shown in FIGS. 2 and 3 for sake of simplicity.

The central connection portion 13b of the membrane 13 is circular or polygonal and continuous and functions as a connection element which prevents opposite regions of the membrane 13 from separating as a result of deformations of the same membrane 13. It should be noted that, for this purpose, it is not essential that the central connection portion 13b of the membrane 13 be completely continuous and free of openings. Even in the presence of possible openings, the central portion 13b of the membrane 13 acts as a connection element that prevents the same membrane 13 from opening uncontrollably, while maintaining the yielding. In one embodiment, the central position 13b extends in a radial direction approximately for one third of the radius R of the membrane 13.

In the intermediate portion 13c, the membrane 13 has through slits of elongated shape. In particular, the membrane 13 has through radial slits 17 and circumferential slits 18 which extend symmetrically with respect to the center C around the central connection portion 13b of the membrane 13. The radial slits 17 and the circumferential slits 18 have a greater dimension or length (respectively in the radial and circumferential direction) and a smaller dimension or width transversely to the length (respectively in the circumferential and radial direction).

In the embodiment of FIGS. 2-5, the membrane 13 has eight radial slits 17 angularly spaced in a uniform manner, which extend from the central connection portion to the inner edge of the peripheral portion 13a and of the piezoelectric actuator 15. The circumferential slits 18 are arranged around the central connection portion 13b of the membrane 13 part along an outer circumference (or polygonal line) and part along an inner circumference (or polygonal line). In one embodiment, the circumferential slits 18 arranged along the outer circumference are more numerous and have a shorter length with respect to the circumferential slits 18 arranged along the inner circumference. Furthermore, the circumferential slits 18 of the outer circumference are angularly offset with respect to the circumferential slits 18 of the inner circumference. Each radial slit 17 joins a radially inner end with a respective circumferential slit 18 of the outer circumference such that the respective radial slit 17 and the respective circumferential slit 18 form a T-like shape (see at least FIG. 2 of the present disclosure). It is understood that the number, the length and the arrangement of the radial slits 17 and of the circumferential slits 18 may be chosen differently from what has been described based on the design preferences to obtain a desired response of the electroacoustic transducer in terms of sound pressure level on the audio bandwidth.

Figure 6:
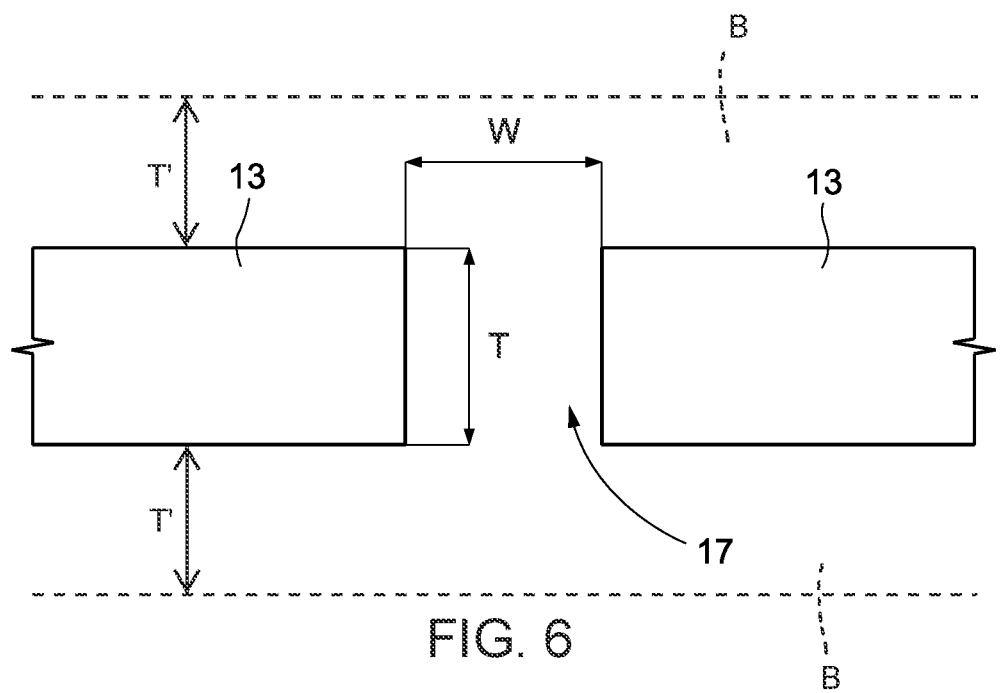
FIG. 6 is a cross-section through the transducer of FIG. 2, cut along line VI-VI of FIG. 4.
Figure 7:
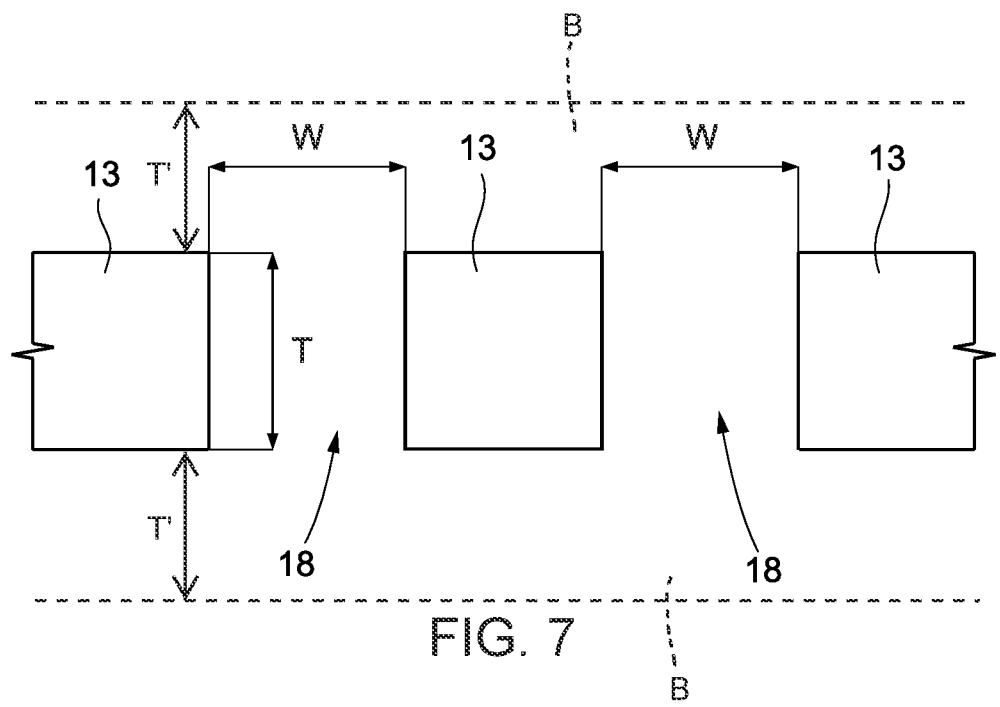
FIG. 7 shows an enlarged detail of FIG. 5.

In one embodiment, the radial slits 17 and the circumferential slits 18 all have the same width, denoted by W in FIGS. 6 and 7. The width W of the radial slits 17 and the circumferential slits 18 is lower than twice a thickness T' of a viscous boundary layer of air B, in particular in an operating temperature range comprised, for example, between −20° C. and +40° C. In one embodiment, the width W is lower than the thickness T' of the viscous boundary layer of air B and is, however, not greater than 10 μm. Furthermore, a ratio between the width W and a thickness T of the membrane 13 is not greater than 1. In other embodiments, the slits may have different widths from each other, according to the design preferences, provided that the widths are lower than twice the thickness T' of the viscous boundary layer of air B.

The presence of the slits 17, 18 increases the overall yielding of the membrane 13 with respect to the case of a continuous membrane of the same dimensions. Consequently, the membrane 13 is subject to greater displacements from the rest position, to the advantage of the sound pressure produced. As already mentioned, in fact, the sound pressure P is given by $$P \propto A*d*f$$

where A is the area of the membrane, d is the displacement, f the vibration frequency and the symbol "∝" denotes a proportionality relationship. The increase in the displacement d thus translates into a corresponding increase in the sound pressure P, especially significant at low frequencies.

At the same time, the width of the slits 17, 18 is sufficiently small to avoid a significant air flow and therefore, from an acoustic point of view, the membrane 13 behaves like a closed or continuous membrane, while being mechanically open.

The continuous structure of the membrane 13 in the central connection portion 13b has different advantageous effects. In the first place, the connection through the central connection portion 13b avoids excessive deformations and, in particular, that the slits 17, 18 may open up to create vents such that they compromise the response of the electroacoustic transducer 10. In addition, the central connection portion 13b of the membrane 13 contributes to maintaining the movement symmetrical and uniform, so that the slits 18 keep the same width W during the out-of-plane displacement of the membrane 13. The central connection portion 13b also allows any defects due to process spread relating to initial position misalignments due to residual stresses to be compensated or at least mitigated. In particular, the behavior of the membrane 13 is less affected by the position of the device inside the semiconductor wafer during manufacturing. As a result, the percentage of defective pieces and rejects is advantageously reduced.

Therefore, the present disclosure allows MEMS device manufacturing technologies to be exploited to provide electroacoustic transducers and micro-amplifiers with high performances and audio reproduction quality. Therefore, further advantages related to MEMS technology result from the present disclosure, such as the high degree of miniaturization, the reduction or elimination of back-end processing steps and compatibility with SMT soldering processes.

Figure 8:
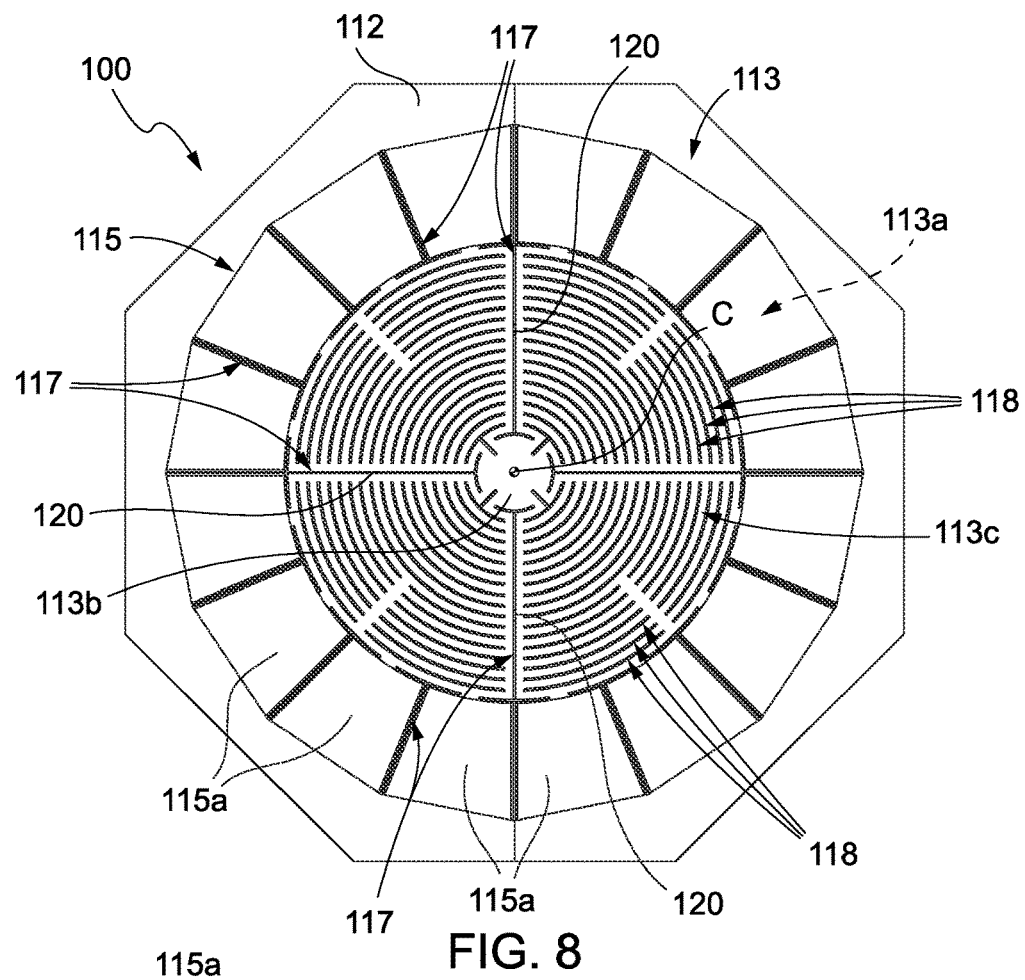
FIG. 8 is a top-plan view of an electroacoustic transducer according to a different embodiment of the present disclosure.
Figure 9:
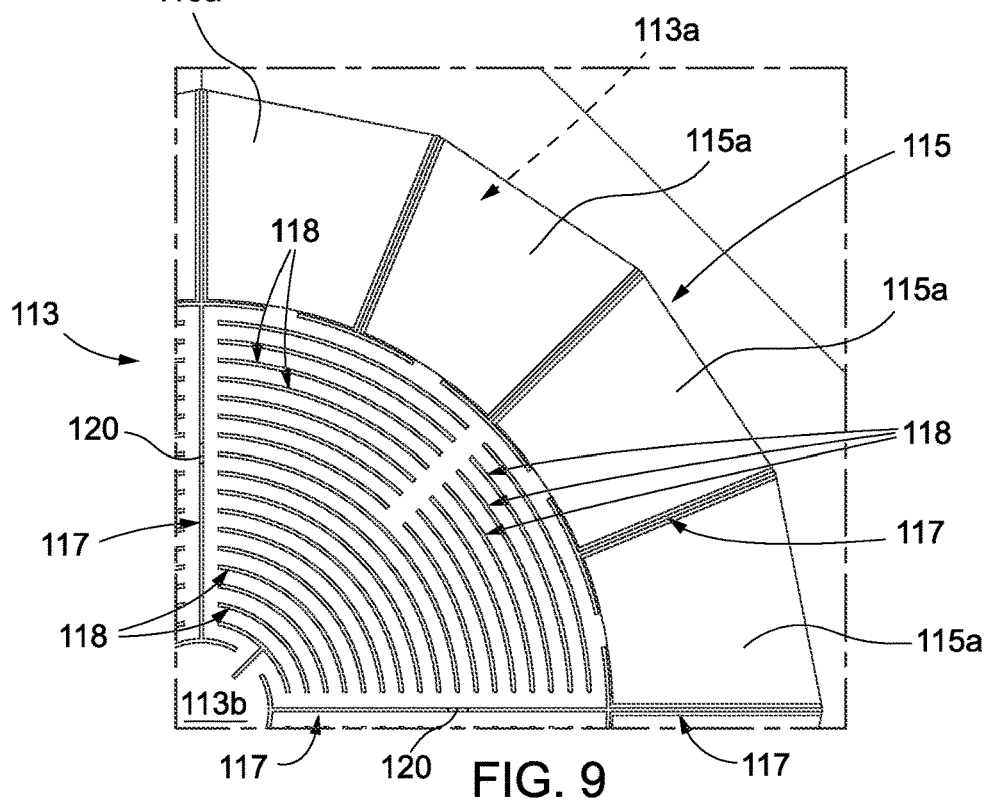
FIG. 9 shows an enlarged detail of FIG. 8.
Figure 10:
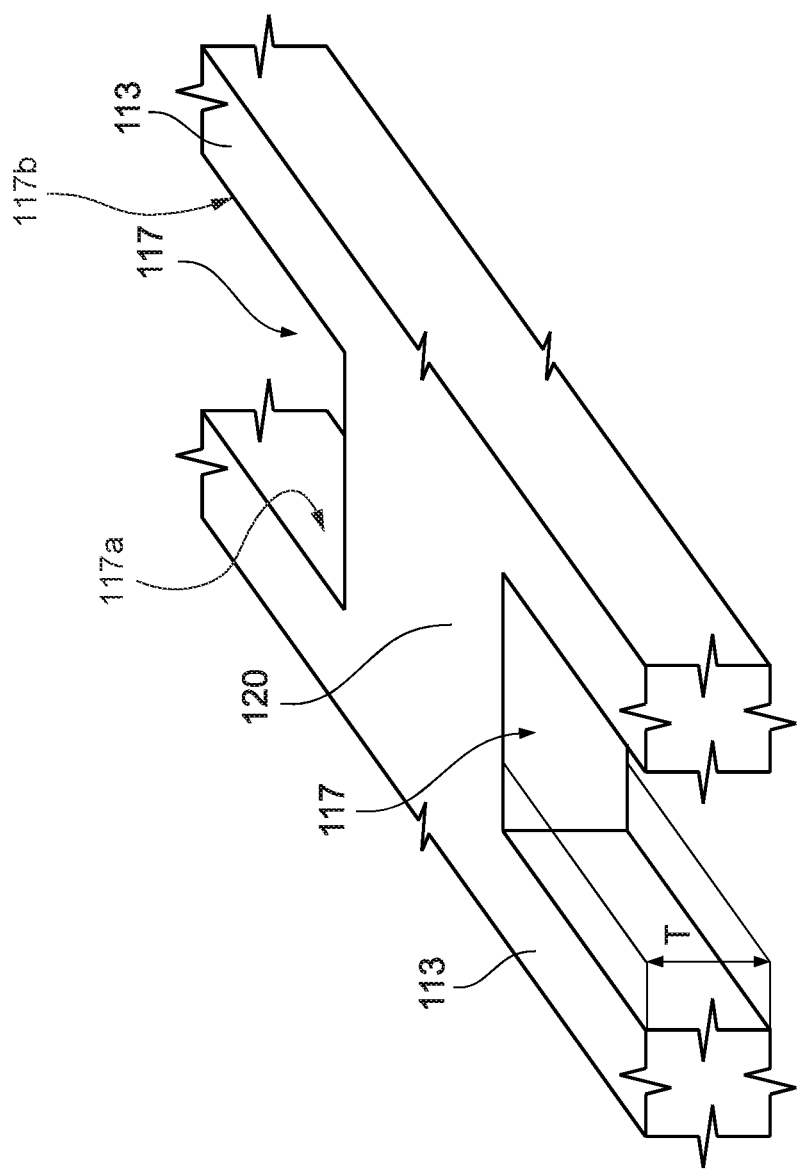
FIG. 10 is a perspective view of an enlarged detail of the transducer of FIG. 8.

According to a different embodiment of the present disclosure, illustrated in FIGS. 8-10, an electroacoustic transducer 100 comprises a supporting frame 112, a membrane 113 and a piezoelectric actuator 115. As already described, the supporting frame 112 and the membrane 113 are of semiconductor material and the piezoelectric actuator 115 is arranged on a peripheral portion 113a of the membrane 113 which extends radially for about one third of the radius of the same membrane.

The membrane 113 has the peripheral portion 113, accommodates the piezoelectric actuators 115, has a central connection portion 113b, and has an intermediate portion 113c between the peripheral portion 113a and the central connection portion 113b.

In the embodiment of FIGS. 8 and 9, the piezoelectric actuator 115 comprises a plurality of piezoelectric actuation structures 115a which have a trapezoidal shape and occupy peripheral portions of respective segments of the membrane 113.

The membrane 113 has radial slits 117 and circumferential slits 118. The radial slits 117 extend between pairs of piezoelectric actuation structures 115a adjacent to the supporting frame 112 for a length slightly greater than a radial dimension of the piezoelectric actuation structures 115a. In proximity to radially inner ends of the piezoelectric actuation structures 115a, the radial slits 117 intersect respective circumferential slits 118. The piezoelectric actuation structures 115a form, with the portions of the membrane 113 whereon they lie, independent cantilever actuation elements.

Optionally, some radial slits 117 of greater length extend two by two opposite along perpendicular directions until they intersect further circumferential slits 118 in proximity to the central connection portion 113b of the membrane 113. These types of radial slits 117 may be at the left-hand side, the right-hand side, the top-side, and the bottom-side of the electroacoustic transducer 100 as shown in FIG. 8.

The circumferential slits 118 are arranged along a plurality of concentric circumferences between the central connection portion 113b and the piezoelectric actuator 115. The number of concentric circumferences, for example up to 20, may be chosen according to the design preferences, for example to maximize the out-of-plane displacement of the membrane 113 and the acoustic performances.

The longer radial slits 117 are interrupted by bridges 120 which join and constrain the opposite sides of the same radial slits 117 and may be of the same material forming the membrane 113. An example of a bridge 120 is illustrated in FIG. 10; it is understood that the other bridges 120 are formed in the same manner. The bridge 120 is defined by a continuous portion of the membrane 113, therefore the bridge 120 and the membrane 113 have the same thickness T and are of the same material. The bridge 120 extends across the slit (in this case a radial slit 117; the same applies for the bridges 120 in the circumferential slits 118) from one side 117a to an opposite side 117b. Since the slits 117, 118 are thin and their width corresponds to the length of the bridges 120, in practice, each bridge 120 forces points of the membrane 113 respectively connected to move in an approximately rigid manner with each other, avoiding that the slits open too wide and the acoustically closed membrane condition is broken. More precisely, the stiffness of the bridges 120 is substantially the same as the rest of the membrane 113. However, the width of the bridges 120 is so small that the deformation transversely the respective slits 117, 118 is negligible. The bridges 120 therefore define substantially punctual constraints and do not add stiffening structures on extended portions of the membrane 113. The number, the dimensions and the arrangement of the bridges 120 may be selected according to the design preferences.

A central connection portion 113b of the membrane 113 is continuous and functions as a connection element that prevents opposite regions of the membrane 113 from separating as a result of deformations of the same membrane 113, and cooperates with the bridges 120 to maintain the same width as the slits throughout the out-of-plane displacement of the membrane.

Some of the circumferential slits 118 are separated from each other by respective portions 121 of the intermediate portion 113c. The respective portions 121 extend inward from a region of the intermediate portion 113 in close proximity to the peripheral portion 113a of the electroacoustic transducer 100. The respective portions 121 terminate along the intermediate portion 113c before reaching the central connection portion 113b of the electroacoustic transducer 100.

Figure 11:
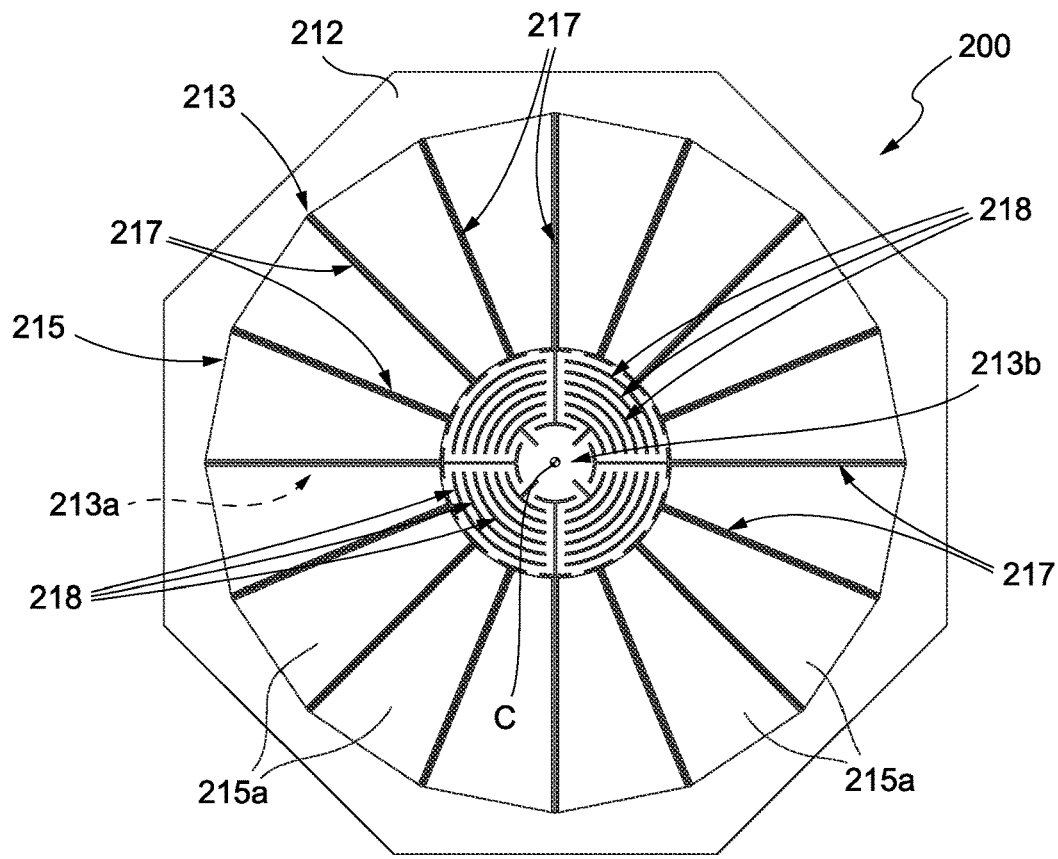
FIG. 11 is a top-plan view of an electroacoustic transducer according to a further embodiment of the present disclosure.
Figure 12:
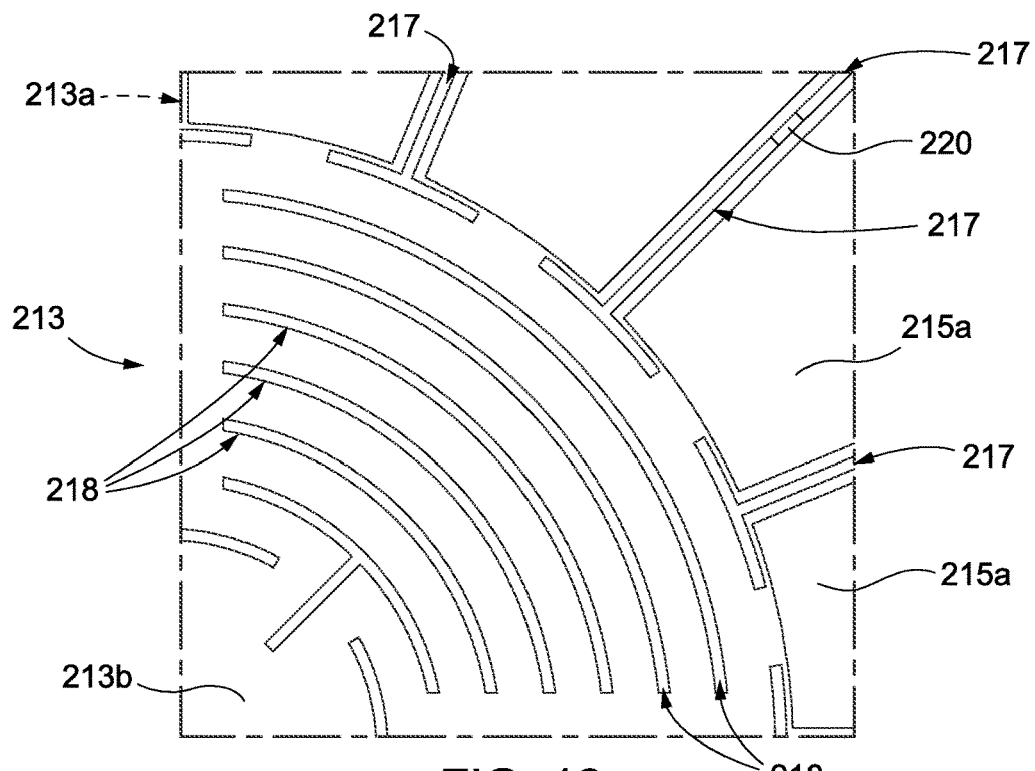
FIG. 12 shows an enlarged detail of FIG. 11.
Figure 13:
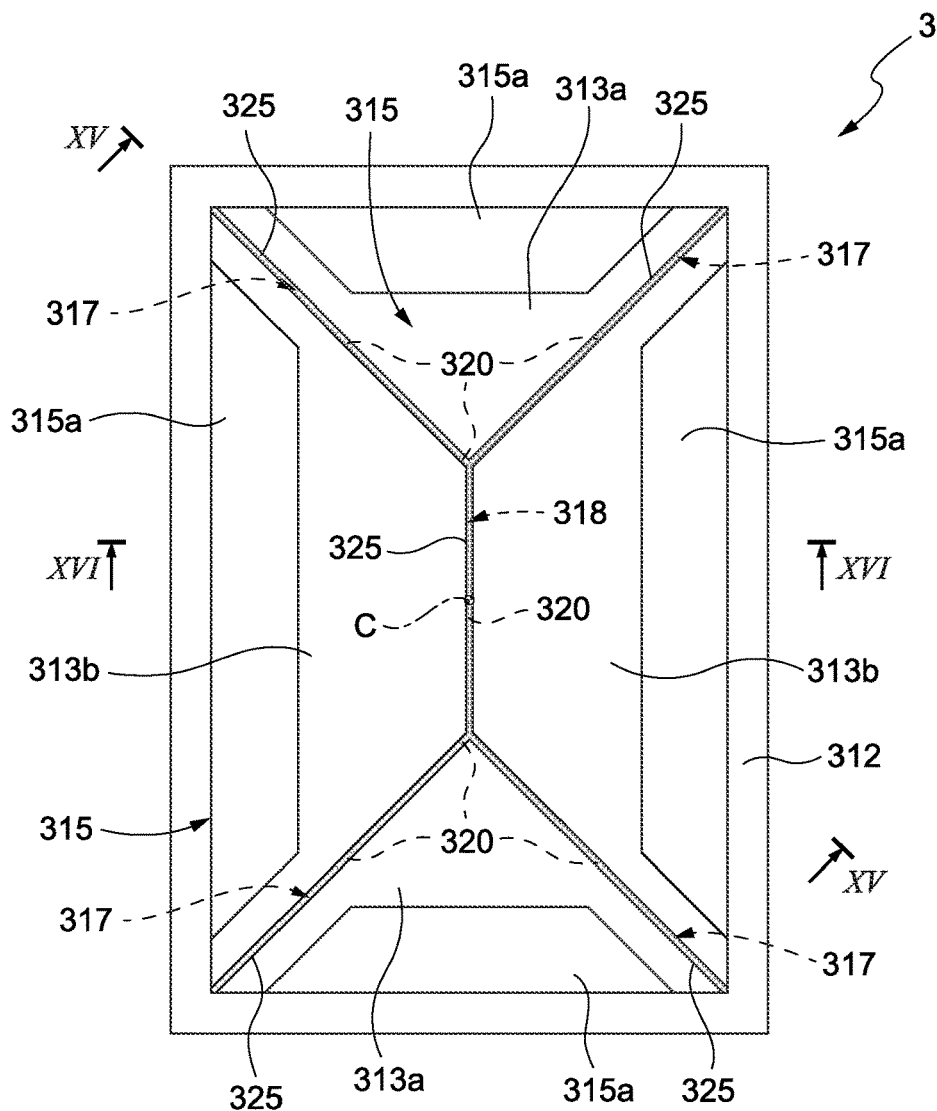
FIG. 13 is a top-plan view of an electroacoustic transducer according to a further embodiment of the present disclosure.
Figure 14:
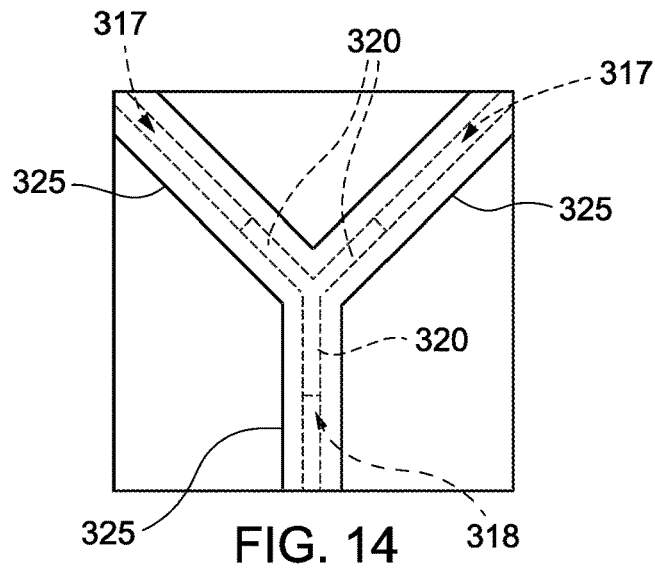
FIG. 14 shows an enlarged detail of FIG. 13.
Figure 15:
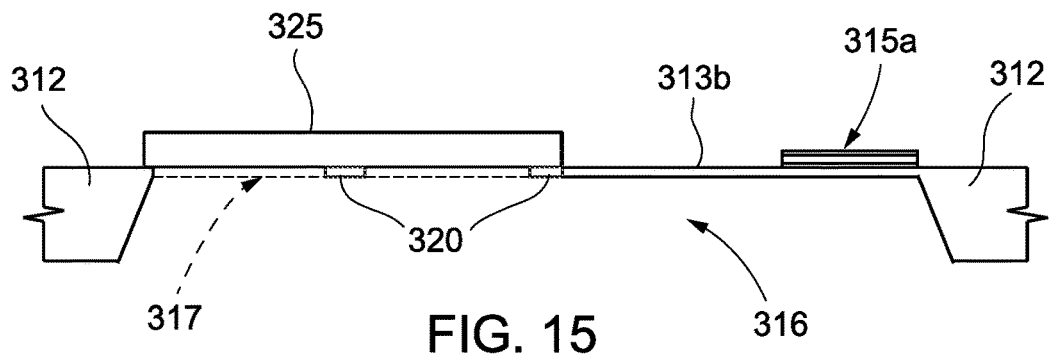
FIG. 15 is a cross-section through the transducer of FIG. 13, cut along line XV-XV of FIG. 13.
Figure 16:
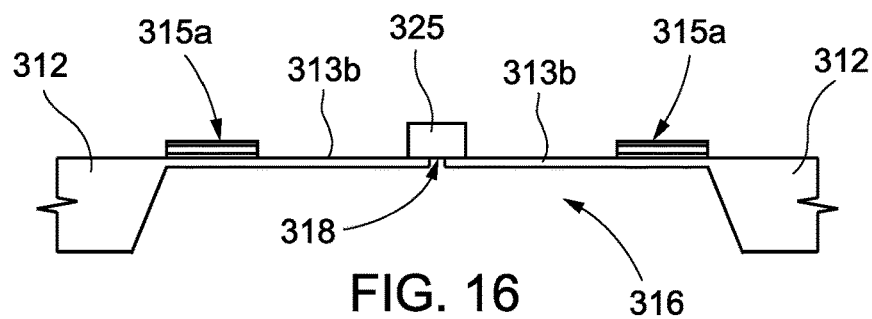
FIG. 16 is a cross-section through the transducer of FIG. 13, cut along line XVI-XVI of FIG. 13.

FIGS. 10 and 11 show an electroacoustic transducer 200 according to a further embodiment of the present disclosure. The electroacoustic transducer 200 comprises a supporting frame 212, a membrane 213 and a piezoelectric actuator 215 on a peripheral portion 213a of the membrane 213, which has radial slits 217 and circumferential slits 218 substantially as already described with reference to FIGS. 8 and 9. In this case, the piezoelectric actuator 215 comprises a plurality of piezoelectric actuation structures 215a of trapezoidal shape, which occupy peripheral portions of respective segments of the membrane 213 and extend in a radial direction for about two thirds of the radius of the membrane 213.

The membrane 213 has the peripheral portion 213a, accommodating the piezoelectric actuators 215, a central connection portion 213b and an intermediate portion 213c between the peripheral portion 213a and the central connection portion 213b.

Some radial slits 217 of greater length extend two by two opposite along perpendicular directions until they intersect further circumferential slits 218 in proximity to the central connection portion 213b of the membrane 213, which is continuous and functions as a connection element, preventing opposite regions of the membrane 213 from separating as a result of deformations of the same membrane 213.

The circumferential slits 218 are arranged along a plurality of concentric circumferences between the central connection portion 213b and the piezoelectric actuation structures 215a.

Bridges 220 are located along at least some of the slits 217, 218, for example along the most radially extended radial slits 217. The bridges 220 constrain opposite sides of the respective slits 217, 218 so that points of the membrane 213 connected by respective bridges 220 move rigidly with each other.

The choice of the dimensions of the piezoelectric actuation structures 215a, in particular in the radial direction, and the ratio between the area dedicated to actuation and the elastic part of the membrane 213 allow the capacitance of the electroacoustic transducer to be determined and its response to be calibrated according to the design preferences.

With reference to FIGS. 13-16, according to one embodiment an electroacoustic transducer 300, of piezoelectric membrane type, comprises a supporting frame 312, a membrane 313 and a piezoelectric actuator 315. The supporting frame 312 has s rectangular inner perimeter P and, similarly to what has already been illustrated, laterally delimits a cavity 316 (FIGS. 15 and 16), which is closed on one side by the membrane 313. Furthermore, as already described, the supporting frame 312 may comprise a substrate, for example of monocrystalline silicon, and one or more epitaxial layers, also of monocrystalline silicon, or pseudo-epitaxial or deposited layers of polycrystalline silicon.

The membrane 313, also of semiconductor material, for example polycrystalline silicon, is connected to the supporting frame 312 along its perimeter and has central symmetry. The perimeter of the membrane 313 coincides with the inner perimeter P of the supporting frame. The membrane 313 is therefore also of rectangular shape and is further divided into two triangular cantilever portions 313a and two trapezoidal cantilever portions 313b by diagonal slits 317 and a central slit 318. The triangular cantilever portions 313a have the shape of isosceles triangles and have the respective bases connected to respective minor sides of the inner perimeter P of the supporting frame 312. The trapezoidal cantilever portions 313b have the shape of isosceles trapezoids and have respective major bases connected to respective major sides of the inner perimeter P of the supporting frame 312. The minor bases of the trapezoidal cantilever portions 313b are adjacent to each other and are separated by the central slit 318, which extends between the vertices of the triangular cantilever portions 313a. The diagonal slits 317 extend between the ends of the central slit 318 and respective vertices of the inner perimeter P of the supporting frame 312 and separate the sides of the triangular cantilever portions 313a from respective adjacent sides of the trapezoidal cantilever portions 313b.

Bridges 320, substantially of the type already described with reference to FIGS. 8 and 9, are located along the diagonal slits 317 and/or the central slit 318. More precisely, in the non-limiting embodiment of FIGS. 13 and 14 they are at the ends and in median portions of the diagonal slits 317 and of the central slit 318. The bridges 320 at the ends of the slits 317, 318 are joined to each other and join the vertices of the triangular cantilever portions 313a to respective adjacent vertices of the trapezoidal cantilever portions 313b. As already observed, however, the number and the position of the bridges 320 may be chosen according to the design preferences. For example, the central slit 318 might have no bridges or have bridges that are offset and opposite with respect to the center. In this manner, the acoustically closed membrane condition may be maintained even in the absence of a central connection portion of the membrane 313.

In one embodiment, the diagonal slits 317 and the central slit 318 are closed with strips 325 of polymeric material formed on the membrane 313, in particular on a face opposite to the cavity 316. The strips 325 may be obtained from a layer of the polymeric material deposited or laminated on the membrane 313 and subsequently patterned with a photolithographic process. In one embodiment, the strips 325 extend throughout the length of the diagonal slits 317 and the central slit 318. The strips 325 have a width slightly greater than the width of the slits 317, 318 and adhere to the triangular cantilever portions 313a and the trapezoidal cantilever portions 313b in proximity of the edges adjacent to the slits 317, 318. In this manner, the strips 325 completely seal one side of the membrane 313. In one embodiment not shown, however, the strips of polymeric material may close the slits 317, 318 only partially. Advantageously, the polymeric material has a Young's modulus not greater than 500 MPa, so as not to considerably stiffen the membrane 313. Consequently, the strips 325 ensure or at least contribute to maintaining the acoustically closed condition of the membrane, without however altering the frequency response. For example, the polymeric material may be a photosensitive polymeric material such as dry resist in film, which may be laminated onto the membrane 313 and defined with a photolithographic process.

In the embodiment of FIGS. 13-16 the width of the diagonal slits 317 and the central slit 318 is lower than twice the thickness T' of the viscous boundary layer of air B. However, given the presence of the strips 325 which actually seal the slits 317, 318, the width of the same slits 317, 318 may be even greater, without violating the acoustically closed membrane condition.

The piezoelectric actuator 315 comprises a plurality of piezoelectric actuation structures 315a of trapezoidal shape, which occupy peripheral portions of the triangular cantilever portions 313a and of the trapezoidal cantilever portions 313b.

Figure 17:
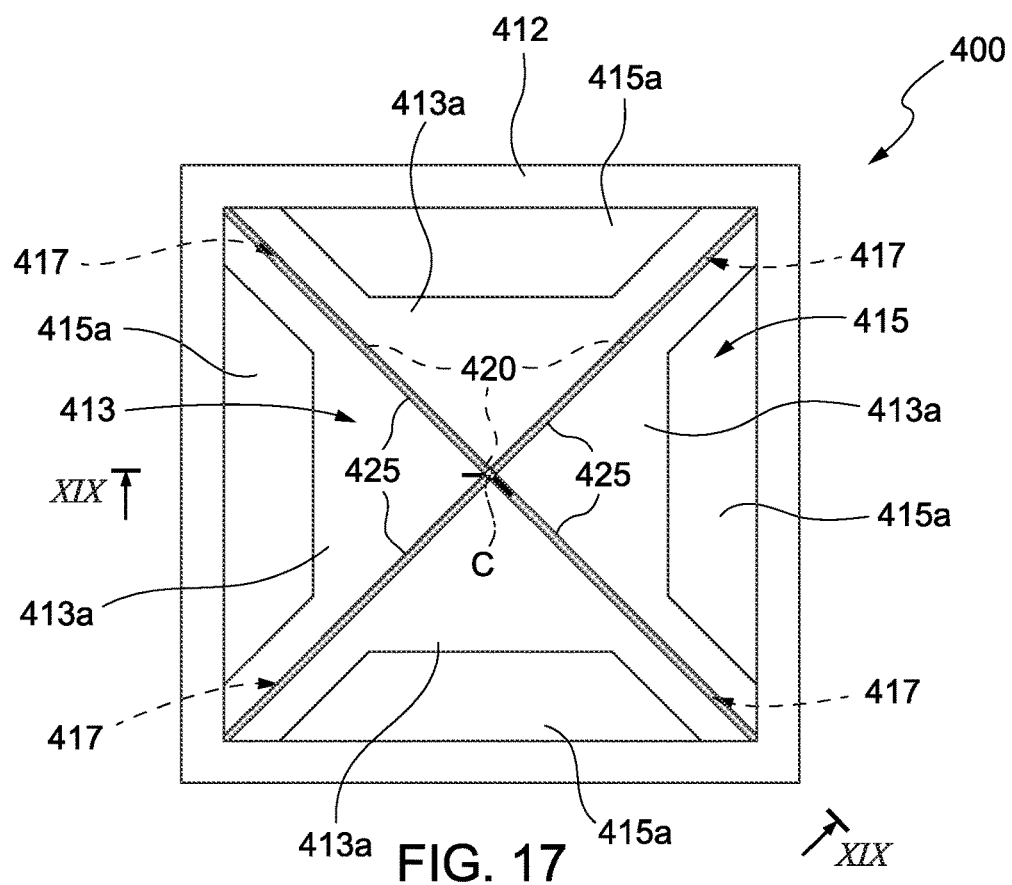
FIG. 17 is a top-plan view of an electroacoustic transducer according to a further embodiment of the present disclosure.
Figure 18:
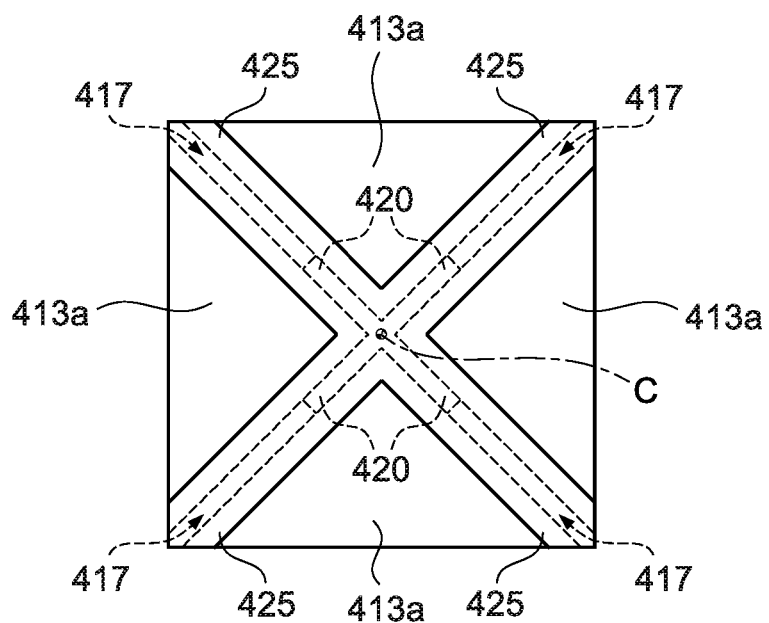
FIG. 18 shows an enlarged detail of FIG. 17.
Figure 19:
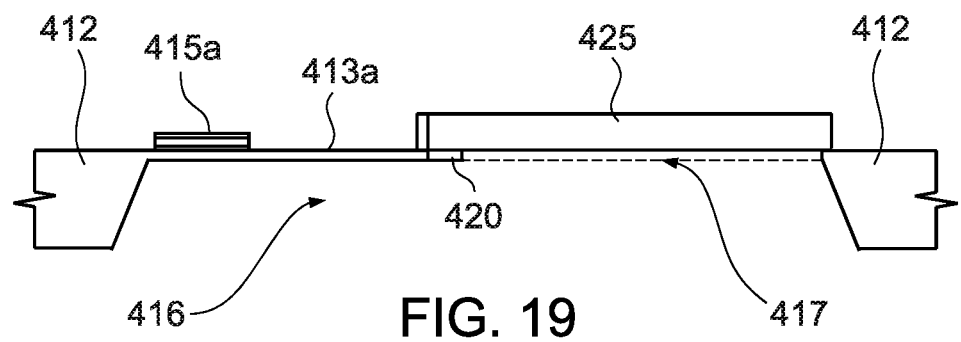
FIG. 19 is a cross-section through the transducer of FIG. 17, cut along line XIX-XIX of FIG. 17.

With reference to FIGS. 17-19, according to one embodiment, an electroacoustic transducer 400 comprises a supporting frame 412, a membrane 413 and a piezoelectric actuator 415. The supporting frame 412 has a square inner perimeter P' and, similarly to what has already been illustrated, laterally delimits a cavity 416 (FIG. 14), which is closed on one side by the membrane 413.

The membrane 413, also of square shape, is connected to the supporting frame 412 along its perimeter, which coincides with the inner perimeter P' of the supporting frame 412. The membrane 413 is also divided into four triangular cantilever portions 413a, identical to each other, by through slits 417 which extend along the diagonals of the membrane 413.

Bridges 420, substantially of the type already described with reference to FIGS. 8 and 9, are located along the slits 417, for example at the ends and in median portions of the slits 317. The bridges 420 which are in the center of the membrane 413 are joined to each other and join the vertices of the triangular cantilever portions 413a, forming a central continuous connection portion. Also in this case, the number and the position of the bridges 420 may be chosen according to the design preferences. For example, bridges may be arranged symmetrically in intermediate portions of the membrane 413. In this case, the bridges illustrated in FIGS. 17-19 in the center of the membrane 413 may be present in addition or be missing, without compromising the acoustically closed membrane condition throughout the audio band.

The slits 417 may be closed with strips 425 of polymeric material formed on one face of the membrane 413 opposite to the cavity 416. The strips 425, which extend throughout the length of the slits 417, have a width slightly greater than the width of the same slits 417 and adhere to the triangular cantilever portions 413a in proximity of the edges.

The piezoelectric actuator 415 comprises a plurality of piezoelectric actuation structures 415a of trapezoidal shape, which occupy peripheral portions of the triangular cantilever portions 413a.

Figure 20:
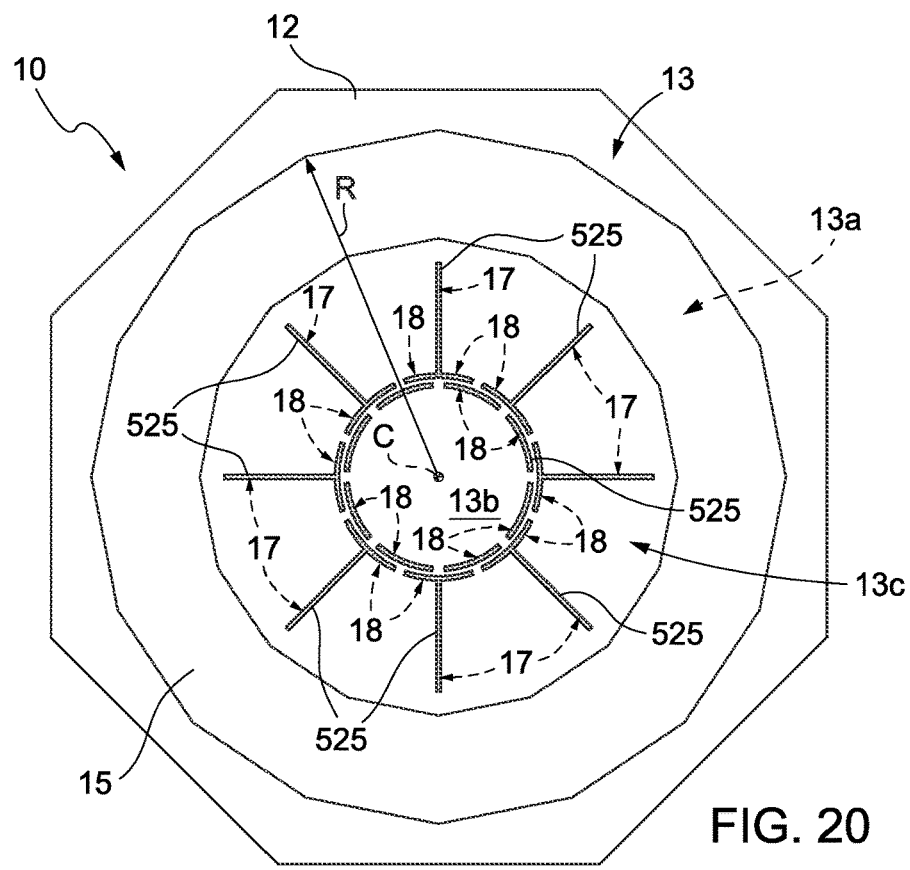
FIG. 20 is a top-plan view of an electroacoustic transducer according to a further embodiment of the present disclosure.
Figure 21:
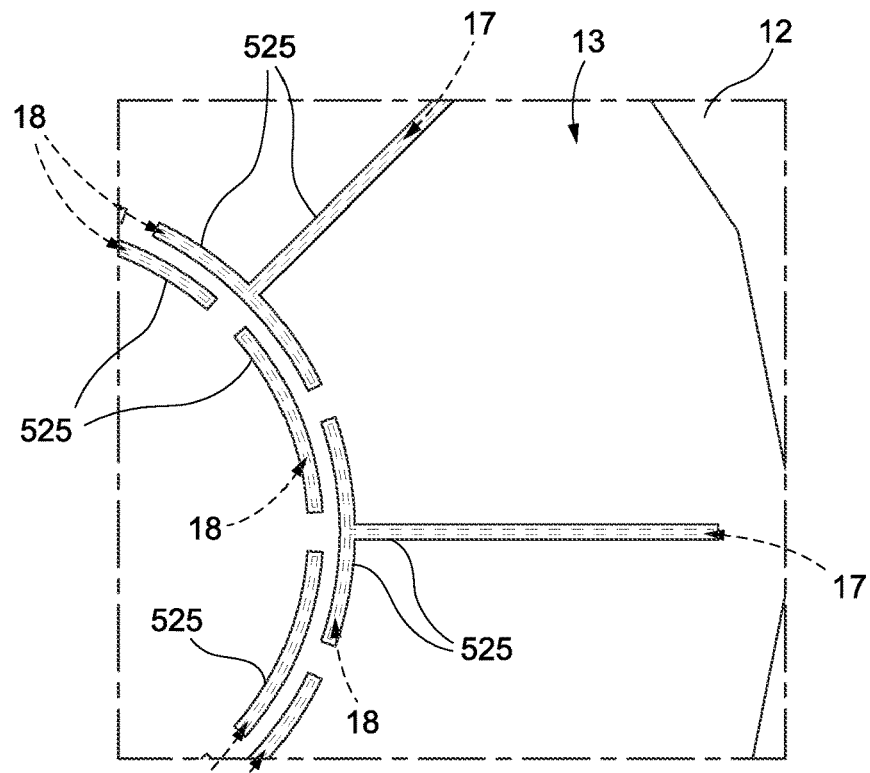
FIG. 21 shows an enlarged detail of FIG. 20.

With reference to FIGS. 20 and 21, an electroacoustic transducer 500 has substantially the same structure as the electroacoustic transducer 1 of FIGS. 2-7, therefore parts identical to those already shown are indicated with the same reference numbers. In this case, the radial slits 17 and the circumferential slits 18 are closed with strips 525 of polymeric material formed on one face of the membrane 13 opposite to the cavity 16. The strips 525 have a slightly greater width than the radial slits 17 and the circumferential slits 18 and extend throughout their length, adhering to the membrane 13 in the proximity of the ends.

Finally, it is evident that modifications and variations may be made to the described electroacoustic transducer, without departing from the scope of the present disclosure, as defined in the attached claims.

As already mentioned, in particular, the configurations described are not to be considered as limiting the number, dimension and arrangement of the slits, which may be selected based on the design preferences to obtain a desired response of the electroacoustic transducer.

In general, furthermore, all the embodiments of the disclosure may include strips of polymeric material which completely or partially close the slits of the membrane.

The arrangement and number of bridges may also vary with respect to what has been described and may also be selected based on the configuration of the slits of the membrane. Furthermore, the bridges may be used in all embodiments and with all the slit configurations according to the design preferences. For example, in some embodiments the bridges may form a central continuous connection portion, which prevents the membrane from opening in the center. In other embodiments, on the other hand, the bridges may be arranged so that the acoustically closed membrane condition is respected even in the absence of a central continuous connection portion.

The strips of polymeric material contribute to maintaining the acoustically closed membrane condition. In some embodiments, the strips may be sufficient to ensure the acoustically closed membrane condition even without a central continuous connection portion and without bridges.

The piezoelectric actuator may have a ring shape or comprise piezoelectric actuation structures that are adjacent, but distinct and separate, according to the design preferences. The number and the dimension of the piezoelectric actuation structures may be chosen based on the configuration of the membrane and the slits.

A microelectromechanical electroacoustic transducer may be summarized as including a supporting frame (12; 112; 212; 312; 412), comprising semiconductor material; a membrane (13; 113; 213; 313; 413) of semiconductor material connected to the supporting frame (12; 112; 212) along a perimeter and having central symmetry; a piezoelectric actuator (15; 115; 215; 315; 415) on a peripheral portion of the membrane (13; 113; 213; 313; 413); wherein the membrane (13; 113; 213; 313; 413) has through slits (17, 18; 117, 118; 217, 218; 317, 318; 417) of elongated shape arranged around a center of the membrane (13; 113; 213; 313; 413).

The supporting frame (312; 412) may have a quadrangular inner perimeter (P; P') and the membrane (313; 413) may be divided into cantilever portions (313a, 313b; 413a) by the through slits (317, 318; 418).

The supporting frame (312) may have a rectangular inner perimeter (P) and the cantilever portions (313a, 313b) may include two triangular cantilever portions (313a), having respective bases connected to respective minor sides of the inner perimeter (P) of the supporting frame (312), and two trapezoidal cantilever portions (313b), having respective major bases connected to respective major sides of the inner perimeter (P) of the supporting frame (312).

The through slits (317, 318) may include diagonal slits (317) and a central slit (318), wherein the diagonal slits (317) extend between ends of the central slit (318) and respective vertices of the inner perimeter (P) of the supporting frame (312) and separate sides of the triangular cantilever portions (313a) from respective adjacent sides of the trapezoidal cantilever portions (313b) and wherein the central slit (318) may extend between vertices of the triangular cantilever portions (313a) and may separate minor bases of the trapezoidal cantilever portions (313b), adjacent to each other.

The supporting frame (412) may have a square inner perimeter (P'), the cantilever portions (413a) may include four triangular cantilever portions identical to each other and the through slits (417) extend along diagonals of the membrane (413).

The through slits (17, 18; 217, 218; 317, 318; 417) may be at least partially closed on one side of the membrane (13; 313; 413) with strips (325; 425; 525) of polymeric material.

The strips (325; 425; 525) may be formed on a face of the membrane (13; 313; 413) opposite to the cavity (16; 316; 416; 516).

The strips (325; 425; 525) may extend throughout the length of the through slits (17, 18; 217, 218; 317, 318; 417).

The strips (325; 425; 525) may have a width greater than a width of the through slits (17, 18; 217, 218; 317, 318; 417) and may adhere to the membrane (13; 313; 413) at edges adjacent to the through slits (17, 18; 217, 218; 317, 318; 417).

The polymeric material may have a Young's modulus not higher than 500 MPa.

The polymeric material may be a photosensitive polymeric material in film.

The membrane (113; 213; 313; 413) may include bridges (120; 220; 320; 420) located along at least some of the through slits (117, 118; 217, 218) and constraining opposite sides of the respective through slits (117, 118; 217, 218; 317, 318; 417) so that points of the membrane (113; 213) connected by respective bridges (120; 220; 320; 420) move with each other.

The membrane may have a central continuous connection portion including at least one of the bridges (120; 220; 320; 420).

Each bridge (120) may be defined by a respective continuous portion of the membrane (113) extending across a respective one of the through slits (117, 118) wherein the bridges (120) and the membrane (113) may have a same thickness (T), the membrane and the bridges (120) being preferably of a same material.

The through slits (17, 18; 117, 118; 217, 218; 317, 318; 417) may have a width (W) lower than twice a thickness of the viscous boundary layer of air, for example not higher than 10 µm.

A ratio between the width (W) of the through slits (17, 18; 117, 118; 217, 218) and a thickness (T) of the membrane (13) may not be greater than 1.

A micro-speaker may be summarized as including an electroacoustic transducer.

An electronic system may be summarized as including a micro-speaker and a processing unit (5) coupled in communication with the micro-speaker.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
   a microelectromechanical electroacoustic transducer including:
      a supporting frame comprising semiconductor material and having a perimeter;
      a central axis; and
      a membrane of semiconductor material coupled to the supporting frame along the perimeter, the membrane having symmetry about the central axis, and the membrane including:
         through slits of elongated shape; and
         a piezoelectric actuator on a peripheral portion of the membrane, and
      wherein the membrane is divided into cantilever portions by respective slits of the through slits, and
      wherein the supporting frame has a rectangular inner perimeter and the cantilever portions include two triangular cantilever portions, having respective bases connected to respective minor sides of the inner perimeter of the supporting frame, and two trapezoidal cantilever portions, having respective major bases connected to respective major sides of the inner perimeter of the supporting frame.

2. The device according to claim 1, wherein the membrane further includes strips of polymeric material that overlap and extend across the through slits.

3. The device according to claim 2, wherein the through slits comprise diagonal slits and a central slit, wherein the diagonal slits extend between ends of the central slit and respective vertices of the inner perimeter of the supporting frame and separate sides of the triangular cantilever portions from respective adjacent sides of the trapezoidal cantilever portions and wherein the central slit extends between vertices of the triangular cantilever portions and separates minor bases of the trapezoidal cantilever portions, adjacent to each other.

4. The device according to claim 2, wherein the through slits are at least partially closed on one side of the membrane with strips of polymeric material.

5. The device according to claim 4, wherein the strips are formed on a face of the membrane opposite to a cavity overlapped by the membrane.

6. The device according to claim 4, wherein the strips extend throughout the length of the through slits.

7. The device according to claim 4, wherein the strips have a first width greater than a second width of the through slits and are coupled to the membrane along edges adjacent to the through slits.

8. The device according to claim 4, wherein the polymeric material has a Young's modulus not higher than 500 MPa.

9. The device according to claim 4, wherein the polymeric material is a photosensitive polymeric material in film.

10. The device according to claim 1, wherein the membrane comprises bridges located along at least some of the through slits, the bridges are configured to, in operation, constrain opposite sides of the respective through slits, and points of the membrane connected by respective bridges are configured to, in operation, move with each other.

11. The device according to claim 10, wherein the membrane has a central continuous connection portion including at least one of the bridges.

12. The device according to claim 10, wherein each bridge is defined by a respective continuous portion of the membrane extending across a respective through slit of the through slits and wherein the bridges and the membrane have a thickness.

13. The device according to claim 1, wherein the through slits have a first width less than twice a thickness of a viscous boundary layer of air, for example not higher than 10 µm.

14. The device according to claim 13, wherein a ratio between the width of the through slits and a thickness of the membrane is less than 1.

15. An electronic system, comprising:
a micro-speaker including an electroacoustic transducer, and the electroacoustic transducer including:
   a supporting frame including semiconductor material and having a perimeter;
   a central axis;
   a membrane of semiconductor material connected to the supporting frame along the perimeter and having symmetry, the membrane including:
      through slits of elongated shape;
   a piezoelectric actuator on a peripheral portion of the membrane, and
   wherein the membrane is divided into cantilever portions by respective slits of the through slits,
   wherein the supporting frame has a rectangular inner perimeter and the cantilever portions include two triangular cantilever portions, having respective bases connected to respective minor sides of the inner perimeter of the supporting frame, and two trapezoidal cantilever portions, having respective major bases connected to respective major sides of the inner perimeter of the supporting frame.

16. The electronic system according to claim 15, further comprising a processing unit in communication with the micro-speaker.

17. A device, comprising:
a microelectromechanical electroacoustic transducer including:
   a supporting frame having a perimeter;
   a central axis;
   a membrane coupled to the supporting frame along the perimeter, the membrane including:
      a peripheral portion coupled to the supporting frame;
      a central portion at the central axis;
      an intermediate portion between the central portion and the peripheral portion, the intermediate portion is coupled to the peripheral portion and the central portion;
   at least one through slit extends along the peripheral portion of the membrane, the at least one through slit including:
      a radial portion that extends in a radial direction directed from the perimeter to the central axis; and
      a circumferential portion that extends in a circumferential direction that is transverse to the radial direction.

18. The device of claim 17, further comprising a plurality of circumferential through slits along the intermediate portion and spaced closer to the central axis than the circumferential portion of the at least one through slit.

19. The device according to claim 15, wherein the membrane further includes strips of polymeric material overlap and extend across the through slits.

20. The device according to claim 15, wherein the through slits have a first width less than twice a thickness of a viscous boundary layer of air, for example not higher than 10 µm.

* * * * *